United States Patent [19]

Pivirotto

[11] 4,328,464
[45] May 4, 1982

[54] HIGH POWER METALLIC HALIDE LASER

[76] Inventor: Robert A. Frosch, Administrator of the National Aeronautics and Space Administration, with respect to an invention of Thomas J. Pivirotto, La Canada, Calif.

[21] Appl. No.: 119,339

[22] Filed: Feb. 7, 1980

[51] Int. Cl.³ .......................... H01S 3/05; H01S 3/097
[52] U.S. Cl. ...................................... 330/4.3; 372/56; 372/58; 372/82
[58] Field of Search ................... 330/4.3; 331/94.5 G, 331/94.5 PE

[56] References Cited

U.S. PATENT DOCUMENTS

| | | | |
|---|---|---|---|
| 3,634,778 | 1/1972 | Melikian et al. | 331/94.5 G |
| 3,921,098 | 11/1975 | Hoag | 331/94.5 G |
| 3,931,589 | 1/1976 | Aisenberg et al. | 330/4.3 |
| 3,936,772 | 2/1976 | Sucov et al. | 331/94.5 G |
| 4,060,769 | 11/1977 | Mallozzi et al. | 330/4.3 |
| 4,084,908 | 4/1978 | Johnson | 330/4.3 |
| 4,126,833 | 11/1978 | Hundstad et al. | 331/94.5 G |
| 4,228,408 | 10/1980 | Schimitschek et al. | 331/94.5 G |
| 4,230,995 | 10/1980 | Burnham | 331/94.5 G |

OTHER PUBLICATIONS

Cross et al., "Cataphoretic . . . Metal Halide-He Discharges", 6/76, pp. 2395–2401, Jour. Appl. Phys., vol. 47, #6.
Pivirotto, "Potentially High-Power Copper Halide Laser", 2/9/78, Paper at OSA/IEEE Conf. on Laser and Electrooptical Systems, p. 74.
Strait, "A Distributed . . . High-Energy Gas Laser Facility", 9/77, pp. 36–43, Computer, vol. 10, #9.

Primary Examiner—Nelson Moskowitz
Attorney, Agent, or Firm—Paul F. McCaul; John R. Manning

[57] ABSTRACT

A high power metallic halide laser capable of providing 300 watts of output power. More specifically, a laser amplification system is disclosed whereby a metallic halide vapor such as copper chloride ($Cu_3Cl_3$) is caused to flow through a laser amplifier (10) and a heat exchanger means (24) in a closed loop system whereby the flow rate is altered to control the temperature rise across the length of the laser amplifier. In the copper chloride laser described in an exemplary embodiment, the copper atoms within the laser amplifier should not exceed a temperature of 3000° K. so that the number of copper atoms in the metastable state will not be high enough to prevent amplification in the amplifier. In addition, a molecular dissociation apparatus (20) is provided at the input to the laser amplifier for dissociating the copper chloride into copper atoms and ions and chlorine atoms and ions. The dissociation apparatus includes a hollow cathode tube (56) and an annular ring (60) spaced apart from the tube end (62). A voltage differential is applied between the annular ring and the hollow cathode tube so that as the copper chloride flows therethrough, it is dissociated into copper and chlorine ions and atoms.

6 Claims, 5 Drawing Figures

HIGH POWER METALLIC HALIDE LASER

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435, 42 USC 2457).

TECHNICAL FIELD

The invention relates to high power laser amplifiers and more particularly to high power metallic halide laser amplifiers.

BACKGROUND ART

In a copper vapor laser ground state ($^2S_{\frac{1}{2}}$) copper atoms are pumped by direct electron impact into first resonant states ($^2P_{3/2}$ and $^2P_{\frac{1}{2}}$). Stimulated emission can then occur between these resonant states and the two lower metastable states ($^2D_{3/2}$ and $^2D_{5/2}$). The resulting emission is at two visible wave lengths, 5106 Å ($^2P_{3/2} \rightarrow {^2D_{5/2}}$) and 5782 Å ($^2P_{\frac{1}{2}} \rightarrow {^2D_{3/2}}$). In order to achieve a population inversion between the resonant and metastable states, laser amplifier pumping must be fast, because of short resonant life times, and the metastable population density must be low. Fast pumping is achieved with low induction pulsed discharge circuits. Typical discharge characteristics are, (a) initial rates of current rise of the order of $10^{10}$ amperes per second, and (b) current pulse widths of the order of 100 nanoseconds.

The metastable population density increases during each current pulse and decays between current pulses. It is this decay rate that determines the minimum allowed time between pulses and hence the maximum allowed pulse repetition rate of the laser. The level to which the metastable population density decays can be no lower than the equilibrium value determined by the copper vapor temperature. It is theorized that if the copper vapor temperature is allowed to exceed 3000° K., the equilibrium metastable population density will be too high and the population inversion will not occur.

The copper vapor laser has a demonstrated efficiency of about 1%. Hence about 100 times the extracted optical energy is deposited in a lasant-buffer gas mixture with each pulse and this energy or waste heat must be removed while assuring that the lasant temperature does not exceed about 3000° K.

Experiments to date on copper halide lasers have been conducted in relatively small bore tubes where the tube wall plays a dominant role in removing waste heat. The small volume of these tubes has limited the average power to the order of 10 watts. By using an oscillator and several amplifiers, this power could probably be increased by a factor of 10. In order to make large increases in average output power, however, amplifiers with large cross-sectional areas would be required. Extracting the waste heat, while maintaining the lasant at or below about 3000° K., and providing fast uniform discharges has become a major challenge.

The present invention provides a means for solving the above problem by flowing a copper vapor and buffer gas through a laser amplifier at a rate just high enough to prevent overheating of the copper atoms. Heat is removed from the laser amplifier by convection, as the lasant-buffer gas mixture absorbs waste heat. Within the amplifier, the temperature will increase linearly from about 700° K. at the amplifier entrance port to about 3000° K. at the exit port. The 700° K. entrance port temperature is determined by the required vapor pressure when copper chloride is the source of copper atoms.

STATEMENT OF INVENTION

The invention provides a laser amplification system which includes a laser amplifier having input means for receiving energy from a laser oscillator. A heat exchanger in fluid communication with the laser amplifier is provided. A means for flowing a metallic halide and a buffer gas in a closed loop manner through the laser amplifier and the heat exchanger is also provided whereby the temperature of the metallic halide and the buffer gas within the laser amplifier is maintained between predetermined temperature limits. In accordance with a further feature of the invention, a molecular dissociation means located at the input of, and in fluid communication with, the laser amplifier is provided. The molecular dissociation means converts the metallic halide molecules into metallic atoms and ions and halide atoms and ions, thereby providing metallic atoms for the laser amplifier.

In a specific embodiment of the invention, the metallic halide is copper chloride and the buffer gas is helium. Utilizing a laser amplifier having a cross-section of $8 \times 8$ centimeters and a length of 50 centimeters, it is theorized that a laser amplifier provided by the invention having a closed loop pressure of 100 torr and a flow velocity of $4 \times 10^3$ centimeters per second inside the laser amplifier, a specific optical energy per pulse of 5 $\mu J/cm^3$, a pulse repetition of $2 \times 10^4$ Hz, and a peak voltage drop across a transverse discharge means within the laser amplifier between 8 and 10 kilovolts, that a 300 watt output beam can be obtained.

Also provided is a molecular dissociation apparatus for dissociating the metallic halide into copper and halide ions and atoms and a pulse power supply capable of providing 8–10 kilovolts at a $2 \times 10^4$ Hz pulse repetition rate. The pulse power supply utilizes a hydrogen thyratron in conjunction with an energy storage capacitor.

BEST MODE FOR CARRYING OUT THE INVENTION

Detailed illustrative embodiments of the invention disclosed herein exemplify the invention and are currently considered to be the best embodiments for such purposes. They are provided by way of illustration and not limitation of the invention. Various modifications thereof will occur to those skilled in the art, and such modifications are within the scope of the claims which define the present invention.

As previously explained, the disclosure describes a laser amplification system which includes a laser amplifier having an input means for receiving energy from a laser oscillator. The laser amplifier is chosen to be of the transverse discharge type. A molecular dissociation means is provided for dissociating a metallic halide such as copper chloride into metallic atoms and ions and halide atoms and ions. The metallic halide is mixed with a buffer gas such as helium. The dissociated metallic halide and buffer gas is flowed into the laser amplifier wherein the copper ground state atoms are pumped by direct electron impact into first resonant states ($^2P_{3/2}$ and $^2P_{\frac{1}{2}}$). Stimulated emissions can then occur between these resonance states and the two lower metastable states ($^2D_{3/2}$ and $^2D_{5/2}$). The resulting emissions are at two visible wave lengths, 5106 Å and 5782 Å. The flow rate of the metallic halide and buffer gas through the laser amplifier is chosen so that the temperature exiting the amplifier is not greater than 3000° K. Heat from the laser amplifier is removed by convection due to the flow of the heated metallic halide and buffer gas, and passes through a heat exchanger where it is cooled to a predetermined lower level. The gas is then flowed from the heat exchanger and back through the molecular dissociation apparatus and into the laser amplifier where the process is then repeated. The flow rate can be controlled so that the temperature within the laser amplifier does not exceed 3000° K., thereby allowing an output from the laser amplifier to be at least 300 watts.

Figure 1:
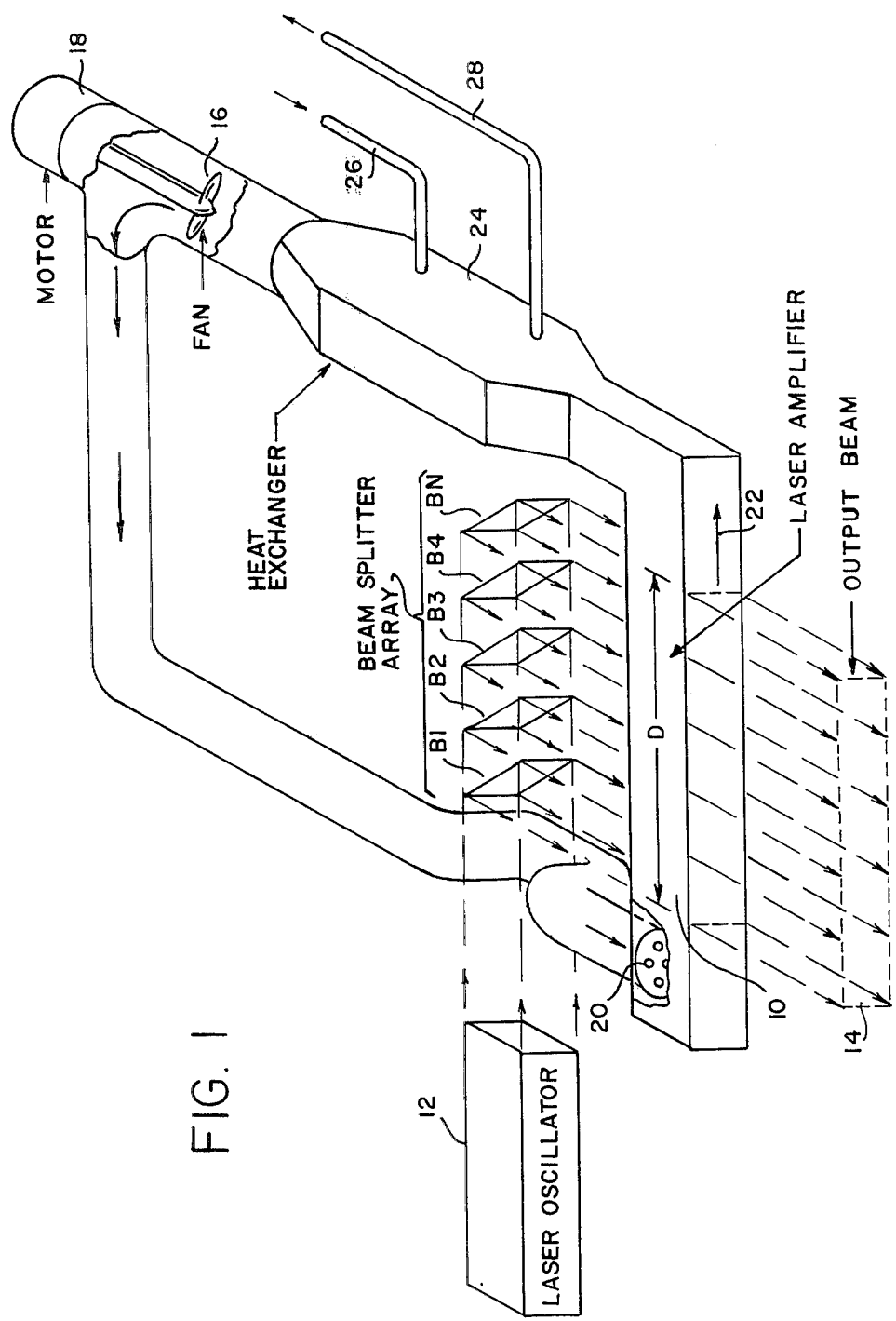
FIG. 1 is a diagrammatic representation of a laser amplification system provided by the invention.

Referring now to FIG. 1, a laser amplification system provided by the invention is shown. A laser amplifier 10 is irradiated by energy to be amplified from a laser oscillator 12. The output energy from the laser oscillator is passed through a plurality of beam splitters B1-BN which are chosen so that the energy output from the laser oscillator 12 is substantially evenly distributed along the length D of the laser amplifier 10. An output beam 14 is provided by the laser amplifier 10. A metallic halide and a buffer gas is flowed by the action of a fan 16 and associated motor 18 through a molecular dissociation apparatus 20 in fluid communication with the laser amplifier which converts the metallic halide into metallic atoms and ions and halide atoms and ions. A plurality of molecular dissociation apparatus 20 are formed in an array at the input to the laser amplifier 10. Rotation of the fan 16 is chosen so that the dissociated metallic halide and buffer gas will leave the laser amplifier as indicated by the arrow at 22 at a temperature not significantly over 3000° K. This heat is convected by flow of the gas to a heat exchanger 24 where it is conducted through conduction tubes 26 and 28 to an appropriate heat sink (not shown). As the dissociated metallic halide is cooled, it again forms metallic halide molecules.

In a specific embodiment of the invention, the metallic halide is chosen to be copper chloride ($Cu_3Cl_3$) and the buffer gas is chosen to be helium. However, other metallic halides such as manganese chloride, iron chloride, lead chloride, copper bromide, copper iodide, or the like could also be utilized. Also, although helium is used as the buffer gas, any of the other noble gases such as neon or argon could also have been selected. Thus as can be appreciated, the temperature within the laser amplifier is controlled both by the rate of flow of the dissociated metallic halide and buffer gas through the laser amplifier, and the cooling efficiency of the heat exchanger 24. As previously explained, a sufficiently high flow rate allows the dissociated metallic halide and buffer gas to be maintained at a relatively cool temperature, such as 3000° K., in order to maintain the equilibrium metastable population density, which is determined by the copper vapor temperature, at a low level such that a population inversion can be attained. It is estimated that if the copper vapor temperature is allowed to exceed 3000° K., the equilibrium metastable population density will be too high and the population inversion as previously described will not occur. The heat exchanger 24 is configured to be of the type that the exit temperature of the dissociated metallic halide and buffer gas is chosen to be approximately 700° K., thus providing a 2300° K. temperature differential along the distance D of the laser amplifier 10. In the specific embodiment described, it is theorized that with the distance D being 50 centimeters and the cross-sectional area of the laser amplifier 10 being 64 cm$^2$, that the output beam 14 will contain in the order of 300 watts of energy. As previously explained, it is the temperature of the metallic atoms that is critical to the maintenance of an efficient amplifier. Thus the apparatus provided by the invention allows a critical upper-limit temperature not to be exceeded by controlling the flow rate of the metallic atoms through the laser amplifier, and by conducting heat away from the laser amplifier through convection currents formed by the flowing dissociated metallic halide and buffer gases.

Figure 2:
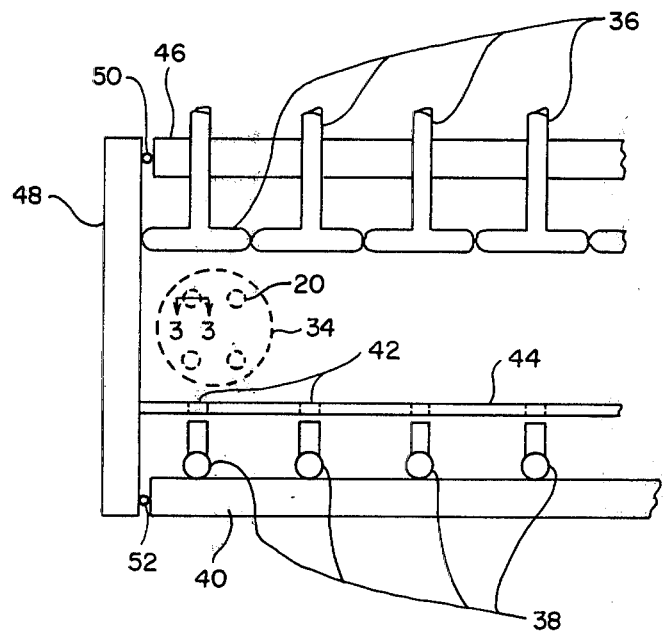
FIG. 2 is a cross-sectional view showing the transverse discharge apparatus incorporated in the laser amplifier.

A transverse discharge type laser amplifier 10 has been chosen which is capable of maintaining pulse repetition rates between $10^4$ and $2 \times 10^4$ Hz, and peak voltage drops between electrodes between 8–10 kilovolts. Referring to the cross-sectional view of a portion of the laser amplifier 10 shown in FIG. 2, four molecular dissociation apparatus 20 are formed into an array defined by the dotted lines 34. Although four molecular dissociation apparatus 20 are shown, any number could be selected, the only significant factor being that a sufficient number be chosen to maintain the required flow rate. The laser amplifier 10 contains a plurality of Rogowsky profile anodes 36 and a plurality of hollow cathode tubes 38 located on a bottom portion 40 of the laser amplifier 10. The hollow cathode tubes 38 are chosen so that their electron discharge is directed upwardly through holes 42 in a longitudinally extending inner partition 44. The bottom portion of the amplifier 40 and an upper portion 46 are placed in sealing contact with an end plate 48 through appropriate seals 50 and 52. A pulse voltage source to be described below is placed across the hollow cathode tubes 38 and Rogowsky profile anodes 36 so as to provide 8000 volt pulses at a rate of 10,000 per second.

Figure 3:
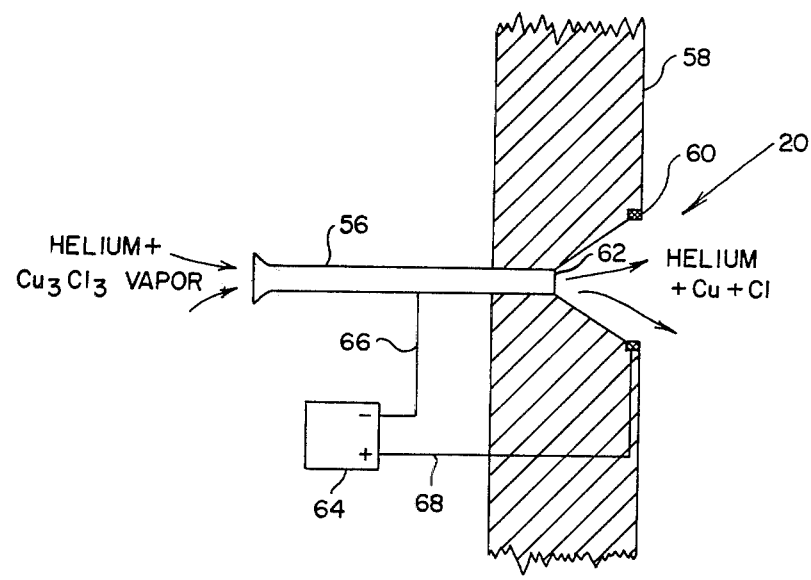
FIG. 3 is cross-sectional view showing the hollow cathode dissociation apparatus.

As previously explained, the method disclosed by the invention for removing waste heat from a large laser amplifier requires flowing the metallic vapor and buffer gas through the amplifier at a rate just high enough to prevent overheating of the metallic atoms. The lasant-buffer gas mixture will absorb the waste heat, and its temperature will increase linearly between the amplifier entrance port and the amplifier exit port. The required temperature of the copper atoms entering the amplifier is determined by the required vapor pressure of the metallic atoms when a metallic halide is used as the metallic atom source. To maximize the overall efficiency of a large, multiple pulsed amplification system being described, the metallic halide vapor must be dissociated efficiently as it enters the laser amplifier. Referring now to FIG. 3, a molecular dissociation apparatus 20 for breaking the metallic halide into metallic atoms and ions and halide atoms and ions is shown. The hollow cathode tube 56 is rigidly held by a boron nitride holding structure 58. An annular ring 60 formed of a conductive material is spaced apart from the end 62 of the hollow cathode tube closest to the interior of the laser amplifier 10. A DC power supply 64 is configured so that its negative terminal is connected to the hollow cathode tube via a negative terminal interconnection line 66, and its positive terminal is connected to the annular ring 60 via a positive interconnection line 68. In operation, the helium plus copper chloride vapor is provided to one end of the hollow cathode tube 56 and is discharged through the aperture formed by the annular ring 60 as helium plus copper atoms and ions plus chlorine atoms and ions. As previously explained, the temperature of discharge is approximately 700° K. The pressure created by the fan 16 forces the helium and dissociated copper chloride vapor to flow through the laser amplifier and to the heat exchanger 24. The dissociated copper chloride combines to form copper chloride molecules as it cools.

Figure 4:
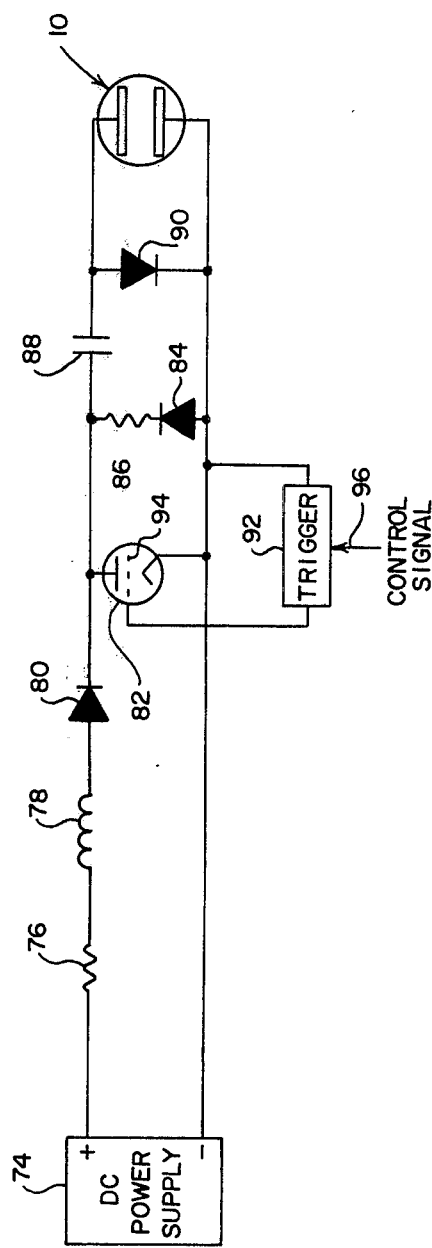
FIG. 4 shows the transverse discharge pulse power supply.

As previously explained, in order to obtain a 300 watt output from the laser amplifier 10, pulse repetition rates between $10^4$ and $2 \times 10^4$ Hz and peak voltages between 8 and 10 kilovolts must be provided to the laser amplifier transverse discharge apparatus. Referring to FIG. 4, a circuit for obtaining such repetition rates and power is shown. A DC power supply 74 is provided. The positive terminal is connected through a dropping resistor 76 and an inductor 78 to a first blocking diode 80. A hydrogen thyratron 82 is connected in parallel across the negative terminal of the DC power supply 74 and the first blocking diode 80. Connected across the anode and cathode of the hydrogen thyratron 82 is a second blocking diode 84 and a loading resistor 86. The loading resistor 86 is connected to the anode of the hydrogen thyratron 82 and to one side of a discharge capacitor 88, the other side of the discharge capacitor 88 being connected to a third blocking diode 90 which is also connected to the negative terminal of the DC power supply 74. The anode and cathode of the laser amplifier 10 are connected across the terminals of the third blocking diode 90. A trigger means 92 is connected between the control grid 94 of the hydrogen thyratron 82 and the negative terminal of the DC power supply 74. A control signal 96 is provided for controlling the rate at which the trigger means 92 causes the hydrogen thyratron 82 to fire.

In operation, the DC power supply 74 through the first blocking diode 80 causes a charge to be built up on the discharge capacitor 88, the time of build-up being related to the time constant of the dropping resistor 76, inductor 78, and discharge capacitor 88 combination. After the charge on the discharge capacitor 88 reaches a constant or steady state level, the trigger means 92 provides a pulse to the hydrogen thyratron grid 94 thereby causing it to short one side of the discharge capacitor 88 to the negative terminal of the DC power supply. This shorting causes a current flow from the discharge capacitor 88 to the negative terminal of the DC power supply, thereby resulting in a large voltage build-up across the laser amplifier 10 and subsequently a pulse discharge to occur in the laser amplifier 10. The dropping resistor 76 prevents an excessive current flow between the DC power supply 74 positive and negative terminals from occurring. In the exemplary embodiment, the DC power supply should be of the type having a 10 kilovolt output at a current of 5 amps.

Figure 5:
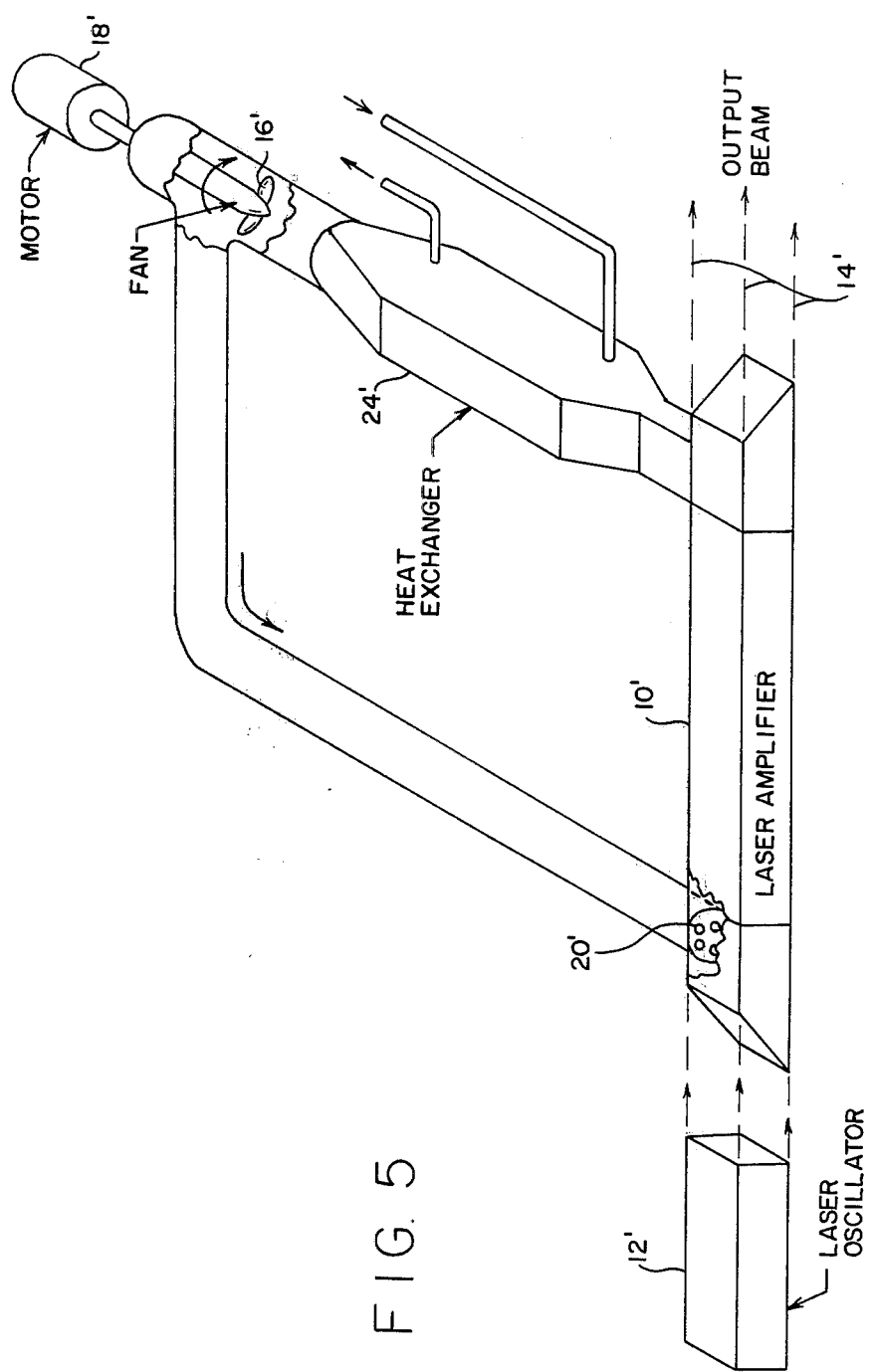
FIG. 5 is a diagrammatic representation of a further embodiment of the laser amplification system.

Referring now to FIG. 5, a further embodiment of the laser amplification system can be seen. Here, the heat exchanger 24', fan 16', and motor 18' operate as described in the first embodiment. However, the laser oscillator 12' is chosen so that it provides energy into the laser amplifier 10' in a direction co-linear with the longitudinal axis of the laser amplifier 10', thereby eliminating a need for the beam splitter array B1-BN described in conjunction with the FIG. 1 embodiment. The output beam of the system is shown at 14' and can be seen to have higher energy density than that provided in the FIG. 1 embodiment.

Thus, as can now be appreciated, a high power laser amplification system has been described wherein the flow rate of a metallic halide and a buffer gas is controlled so that heat may be removed from the laser amplifier by convection, the rate of flow determining the exit temperature of the metallic halide and buffer gas. In addition, a molecular dissociation means has been described whereby the metallic halide can be dissociated to provide metallic atoms and ions and halide atoms and ions at the input to the laser amplifier.

What is claimed is:

1. A laser amplification system comprising:
   a metallic halide laser amplifier having input means for receiving a laser beam;
   a heat exchanger;
   means for flowing a metallic halide and a buffer gas through said laser amplifier and said heat exchanger whereby the temperature of said metallic halide and said buffer gas within said laser amplifier is maintained between predetermined temperature limits; and
   a molecular dissociation means located at an input to said laser amplifier for converting said metallic halide into metallic atoms and ions and halide atoms and ions comprised of;
   a hollow cathode tube array in fluid communication with said laser amplifier;
   a conductive material shaped as an annular ring defining an aperture spaced apart from and electrically isolated from one end of said hollow cathode tube; and
   means for applying a positive voltage differential between said conductive material and said hollow cathode tube whereby said metallic halide becomes dissociated as it flows through said hollow cathode tube and said aperture.

2. The amplification system of claim 1 wherein said laser amplifier comprises a transverse discharge apparatus having cathode means and anode means.

3. The amplification system of claim 2 wherein said anode means comprises Rogowsky profile anodes.

4. The amplification system of claim 2 further comprising means for pulsing said transverse discharge apparatus at a repetition rate of at least $10^4$ Hz.

5. The amplification system of claim 4 wherein said means for pulsing comprises:
   a DC power supply having its output terminals connected to said transverse discharge apparatus anode means and cathode means;
   an energy-storing capacitor connected in series between one of said DC output terminals and said transverse discharge tube;
   a hydrogen thyratron connected in parallel across said DC output terminals; and
   means for causing said energy-storing capacitor to discharge through said hydrogen thyratron, thereby pulsing said transverse discharge apparatus.

6. A laser amplification system comprising:
an elongated metallic halide laser amplifier;
a laser oscillator for providing a laser beam to be amplified by said laser amplifier, said beam being parallel to the longitudinal axis of said amplifying means;
input means for receiving said laser beam in a direction parallel to the longitudinal axis of said laser amplifier, said laser amplifier input means comprising a plurality of beam splitters aligned parallel with the axis of said laser beam, each irradiated by a portion of said beam and each reflecting a portion of said beam through a different segment of said laser amplifier, whereby said plurality of beam splitters oriented along the length of said laser amplifier reflect portions of said beam into said laser amplifier in a direction normal to the longitudinal axis of said laser amplifier;
dissociation means for dissociating a metallic halide into metallic atoms and ions and halide atoms and ions, said dissociation means comprising
a hollow cathode tube array in fluid communication with said laser amplifier and
a conductive material shaped as an annular ring defining an aperture spaced apart from, and centrally located about the end of said hollow cathode tube,
said dissociation means being in fluid communication with said laser amplifier;
cooling means for removing heat from said metallic atoms and ions and halide atoms and ions after having passed through said laser amplifier; and
closed cycle flowing means for flowing a mixture of said metallic halide and a buffer gas through said dissociation means, said laser amplifier, said cooling means, and back to said dissociation means.

* * * * *